United States Patent

[11] 3,602,791

| [72] | Inventors | Alan P. Stevenson<br>Old Bridge;<br>James A. McMurray, Metedeconk, both of, N.J. |
|---|---|---|
| [21] | Appl. No. | 762,401 |
| [22] | Filed | Sept. 25, 1968 |
| [45] | Patented | Aug. 31, 1971 |
| [73] | Assignee | Electronic Associates, Inc.<br>Long Branch, N.J. |

[54] ELIMINATION OF ERRORS IN HYBRID SERVO LOOP
1 Claim, 1 Drawing Fig.

[52] U.S. Cl. ................................................. 318/632, 318/563
[51] Int. Cl. ............................................. G05d 23/275

[50] Field of Search ........................................... 318/20.320, 20.070, 20.530, 20.540

[56] References Cited
UNITED STATES PATENTS

| 3,353,161 | 11/1967 | Toscano | 318/20.320 X |
| 3,491,277 | 1/1970 | Brainard | 318/162 X |
| 3,491,278 | 1/1970 | Stobbe | 318/162 X |

Primary Examiner—T. E. Lynch
Attorneys—Robert M. Skolnik and Edward A. Petrko

ABSTRACT: Position errors are reduced in a servo-driven device where a plurality of desired position points are known, and the path between points is computed by digital differential analyzer techniques, by periodically driving the device to one of the known points after the path is computed ensuring accurate positioning for the start of the new path.

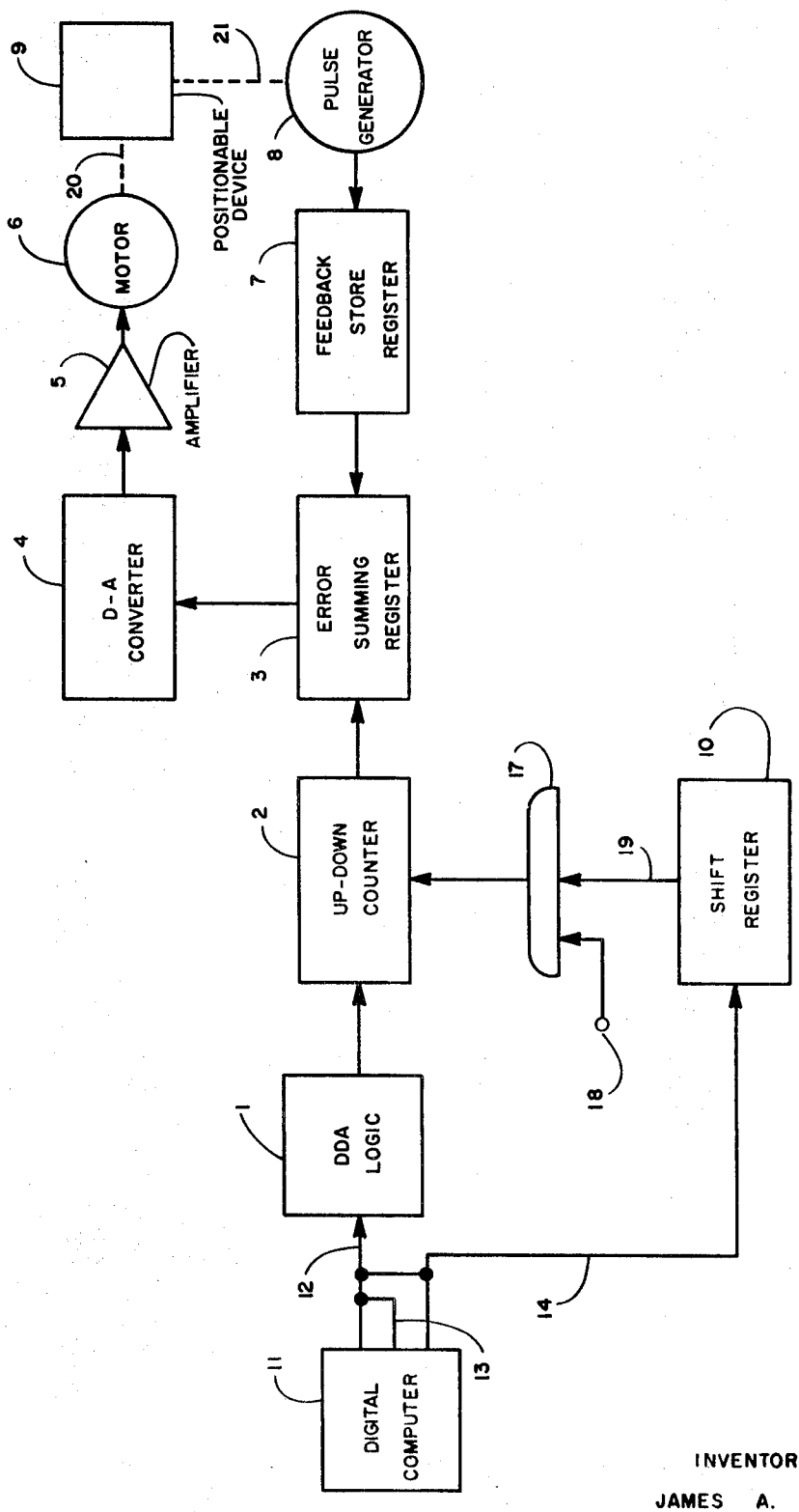

ELIMINATION OF ERRORS IN HYBRID SERVO LOOP

The present invention relates to a system for eliminating errors in a hybrid servo loop.

A hybrid servo loop is one where positional information in digital form is converted to an analog signal to drive a servomotor to the ordered position.

One of the important sources of error in such systems arises because of inaccuracies in the generation of the digital position data itself. These inaccuracies are cumulative; thus, after several iterations, the digital signal representing desired position may no longer represent the correct position.

Where the digital position information is generated by digital differential analyzers, the likelihood of such cumulative error is increased. For example, in U.S. Pat. application Ser. No. 725,418, filed Apr. 30, 1968, in the names of Clifford et al., commonly assigned, a system is disclosed for positioning a device knowing only the beginning and ending position points, and the distance between the points. Digital differential analyzers are used to control the movement of the device between the two points over the known distance in accordance with the solution of mathematical equations defining the desired path configuration. The output of the digital differential analyzer of the end of the known distance should be a signal representing the known endpoint. In practice, that output does not represent the endpoint because of errors in the digital differential analyzer.

The theory and operation of digital differential analyzers is described in detail at pages 19-14 through 19-72 of the *Computer Handbook*, edited by Huskey and Korn, 1st Edition, published in 1962 by the McGraw-Hill Book Company, Inc. As discussed at pages 19-42 et seq., the error sources in a digital differential analyzer are truncation and round off error. Truncation error arises from the incremental nature of the input functions while round off error is caused by the discarding of digits during each iteration. Numerous modifications to reduce the effects of such errors are proposed in the text, all of which are characterized by their high cost and complexity.

The present invention obviates the need for any modification of the digital differential analyzer by providing an additional register connected to a digital data storage register. The additional register periodically updates the position information in the storage register with the known actual position signal for the device.

Thus, if it is desired to drive a device from known point A to known point B for a known distance C, at the end of the distance C, the actual value of point B is applied to correct the value of point B generated by the digital differential analyzer or other logic.

The primary object of the invention is the elimination of any error in the position command signal used to drive a hybrid servo loop.

Another object of the invention is ensuring the accuracy of the final position of a device.

These as well as further objects and advantages of the invention will become apparent from a review of the following specification and drawing in which:

The single FIGURE is a block diagram of the hybrid servosystem embodying the invention.

In the single FIGURE, desired position information in the form of the beginning and ending points and the distance between the points is stored in the storage unit of a digital computer 11. This data is to be used to drive a movable device 9 to the desired ending point over the desired distance. Device 9, which may be the arm of a plotting mechanism, a machine tool, or the like is connected to drive motor 6 via a mechanical connection shown generally at 20. A signal indicative of the actual position of device 9 is developed by pulse generator 8 via mechanical connection 21.

The position information representing the beginning and ending points and distance are massaged in block 1 which may consist of a plurality of digital differential analyzers interconnected in accordance with desired mathematical equations such as disclosed in the aforementioned application of Clifford et al. The output of block 1, a position command signal, is stored in data register 2. In practice, register 2 is a 16-bit up-down counter having serial input and parallel output.

The parallel output of data register 2 is connected to the first input of an error summing register 3. The other input of register 3 is connected to the parallel output of a feedback store register 7 which develops a 16-bit word representing the actual position of device 9.

The parallel output of error summing register 3 is a full 16-bit word representing the difference between desired position and actual position. This error word is converted to analog form in digital-to-analog converter 4. The analog signal is amplified in a conventional amplifier stage 5 and used to drive motor 6 and, thereby, device 9 via mechanical connection 20.

As previously set forth, the desired position word in register 2 does not accurately represent the desired endpoint due to error generated by the digital differential analyzer section 1.

In order to eliminate this inaccuracy, an additional register 10 is provided. Register 10 receives a 16-bit word representing the known endpoint of the computed path. More particularly, computer output cables 12, 13, and 14 carry, beginning point, path length and endpoint information respectively. Computer storage output line 14 is connected to both the DDA section 1 via cable 12 and to the register 10. The parallel output of register 10 is connected to the up-down counter 2 by way of an AND gate 17. The other input of AND gate 17 is connected to a load control terminal 18.

In operation, the endpoint information is periodically stored in register 10. On the occurrence of a pulse at load control terminal 18 from a pulse source, not shown, the true endpoint word is loaded into the data register and alters the massaged data already in the register 2, thus ensuring accurate positioning of the device.

Now that the principal embodiment of our invention has been described, it will be apparent that modifications may be made therein without departing from the spirit and scope thereof: thus, the foregoing specification is intended as illustrative and not as limitative.

We claim:

1. A system for moving a positionable device in response to a plurality of data points over a computed path configuration comprising:
    a device to be positioned,
    a source of data points,
    means connected to said source to compute a position command signal representing the path configuration between several of said points,
    said storage means having an input connected to said computing means for storing said command signal,
    means connected to said first storage means for driving said device as a function of said command signal,
    second storage means having an input connected to said source to develop second output signals identical to selected ones of said data points, and
    control means connected between said first and second storage means for periodically applying the output of said second storage means to said first storage means and effectively disconnecting said computing means from said first storage means thereby ensuring that said device will be driven to said points.